United States Patent
Sakai et al.

(10) Patent No.: US 8,045,097 B2
(45) Date of Patent: Oct. 25, 2011

(54) LIQUID CRYSTAL DISPLAY DEVICE AND VIEWING ANGLE CONTROL MODULE

(75) Inventors: Takehiko Sakai, Matsusaka (JP); Tsuyoshi Okazaki, Nara (JP); Katsuhiko Morishita, Matsusaka (JP); Yoshiharu Kataoka, Tsu (JP); Chikanori Tsukamura, Tsu (JP); Dai Chiba, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 428 days.

(21) Appl. No.: 12/297,922

(22) PCT Filed: Apr. 16, 2007

(86) PCT No.: PCT/JP2007/058252
§ 371 (c)(1),
(2), (4) Date: Oct. 21, 2008

(87) PCT Pub. No.: WO2008/018212
PCT Pub. Date: Feb. 14, 2008

(65) Prior Publication Data
US 2009/0174843 A1    Jul. 9, 2009

(30) Foreign Application Priority Data
Aug. 9, 2006   (JP) .................................. 2006-217408

(51) Int. Cl.
  *G02F 1/1347*    (2006.01)
  *G02F 1/1335*    (2006.01)
(52) U.S. Cl. .......................................... 349/74; 349/65
(58) Field of Classification Search ........................ None
  See application file for complete search history.

(56) References Cited

U.S. PATENT DOCUMENTS

| | | |
|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,386,253 A | 1/1995 | Fielding |
| 5,402,184 A | 3/1995 | O'Grady et al. |

(Continued)

FOREIGN PATENT DOCUMENTS

CN    1550840 A    12/2004

(Continued)

OTHER PUBLICATIONS

International Search Report for PCT/JP2007/058252, mailed Jul. 3, 2007.

(Continued)

*Primary Examiner* — Tina Wong
(74) *Attorney, Agent, or Firm* — Nixon & Vanderhye P.C.

(57) ABSTRACT

In a liquid crystal display device including a display liquid crystal panel and a viewing-angle-control liquid crystal panel and capable of switching viewing angle characteristics, a half wavelength plate for setting a viewing restricted direction is provided between the display liquid crystal panel and the viewing-angle-control liquid crystal panel. This makes it possible to realize a liquid crystal display device that allows a viewing restricted direction to be set as appropriate.

8 Claims, 17 Drawing Sheets

U.S. PATENT DOCUMENTS

| | | | |
|---|---|---|---|
| 5,490,009 A | 2/1996 | Venkateswar et al. | |
| 5,557,353 A | 9/1996 | Stahl | |
| 5,689,283 A | 11/1997 | Shirochi | |
| 5,751,379 A | 5/1998 | Markandey et al. | |
| 5,842,762 A | 12/1998 | Clarke | |
| 5,897,191 A | 4/1999 | Clarke | |
| 5,912,773 A | 6/1999 | Barnett et al. | |
| 5,920,365 A | 7/1999 | Eriksson | |
| 6,028,656 A * | 2/2000 | Buhrer et al. | 349/196 |
| 6,657,690 B2 | 12/2003 | Hashimoto | |
| 7,068,336 B2 * | 6/2006 | Oh et al. | 349/123 |
| 7,468,770 B2 * | 12/2008 | Okumura | 349/123 |
| 7,705,933 B2 * | 4/2010 | Matsushima | 349/75 |
| 7,742,124 B2 * | 6/2010 | Bell | 349/74 |
| 7,760,292 B2 * | 7/2010 | Jin et al. | 349/75 |
| 7,948,580 B2 * | 5/2011 | Sakai et al. | 349/64 |
| 7,956,940 B2 * | 6/2011 | Sakai et al. | 349/12 |
| 2002/0149725 A1 | 10/2002 | Hashimoto | |
| 2004/0036821 A1* | 2/2004 | Paukshto et al. | 349/74 |
| 2004/0252258 A1 | 12/2004 | Matsushima | |
| 2005/0254113 A1* | 11/2005 | Cirkel et al. | 359/259 |
| 2006/0044495 A1 | 3/2006 | Arai | |
| 2008/0084471 A1 | 4/2008 | Yabuta et al. | |

FOREIGN PATENT DOCUMENTS

| | | |
|---|---|---|
| EP | 1 001 306 A2 | 5/2000 |
| JP | 10-268251 | 10/1998 |
| JP | 11-174489 | 7/1999 |
| JP | 2005-257756 | 9/2005 |
| JP | 2006-64907 A | 3/2006 |
| JP | 2006-171333 | 6/2006 |
| JP | 2006-195388 A | 7/2006 |
| JP | 2006-330164 | 12/2006 |
| JP | 2007-148278 | 6/2007 |
| KR | 10-2005-0058901 A | 6/2005 |
| WO | 2006/038574 A1 | 4/2006 |

OTHER PUBLICATIONS

Supplementary EP Search Report mailed Aug. 19, 2010 in corresponding EP application 07741688.1.

* cited by examiner

LIQUID CRYSTAL DISPLAY DEVICE AND VIEWING ANGLE CONTROL MODULE

This application is the U.S. national phase of International Application No. PCT/JP2007/058252, filed 16 Apr. 2007, which designated the U.S. and claims priority to Japan Application No. 2006-217408, filed 9 Aug. 2006, the entire contents of each of which are hereby incorporated by reference.

TECHNICAL FIELD

The present invention relates to a display device (e.g., a liquid crystal display device) capable of switching viewing angle characteristics.

BACKGROUND ART

In general, a display device is required to have a viewing angle characteristic (wide viewing angle characteristic) that allows a sharp image to be viewed from a larger number of viewing points. However, depending on an operation environment, it may be preferable that only a user can view displayed contents. It is highly likely that, for example, a laptop computer, a mobile information terminal (PDA: Personal Data Assistant), or a mobile phone is used in a place, such as a train or an airplane, where the general public is present. In such an operation environment, in view of security protection or privacy protection, it is desirable that the display device takes a viewing angle characteristic (a narrow viewing angle characteristic) with which only a user can view a displayed image (from a limited viewing point) and the surrounding people cannot view the displayed image (from other viewing points).

Recently, it is demanded that one display device is provided with capability of switching between a wide viewing angle characteristic and a narrow viewing angle characteristic.

In response to such a demand, for example, Patent Document 1 discloses a liquid crystal display device in which: a viewing-angle-control liquid crystal panel is provided above a display liquid crystal panel; the viewing-angle-control liquid crystal panel and the display liquid crystal panel are sandwiched by two polarizing plates; and a viewing angle characteristic is controlled by adjusting a voltage that is applied to the viewing-angle-control liquid crystal panel, so that a viewing angle characteristic is controlled.

[Patent Document 1]
Japanese Unexamined Patent Application No. 268251/1998 (Tokukaihei 10-268251) (published on Oct. 9, 1998)

DISCLOSURE OF INVENTION

However, in the conventional liquid crystal display device, a viewing-angle-control liquid crystal panel and an upper polarizing plate need to be provided in accordance with a rubbing direction of a substrate constituting a display liquid crystal panel (or a direction of a polarization axis of a lower polarizing plate). In other words, the display liquid crystal panel determines a direction in which an image can be viewed and a direction in which an image cannot be viewed (viewing restricted direction) in the case of a narrow viewing angle characteristic operation. Therefore, the viewing restricted direction cannot be set unrestrainedly.

The present invention is attained in view of the conventional problem. An object of the present invention is to provide a liquid crystal display device that allows a viewing restricted direction to be set as appropriate.

In order to solve the problem, the liquid crystal display device of the present invention that includes a display liquid crystal panel and a viewing-angle-control liquid crystal panel and that is capable of switching viewing angle characteristics, the liquid crystal display device includes: a retardation member for setting a viewing restricted direction which retardation member being provided between the display liquid crystal panel and the viewing-angle-control liquid crystal panel.

According to the arrangement, an appropriate retardation member (for example, a ½ wavelength plate) is provided between the display liquid crystal panel and the viewing-angle-control liquid crystal panel. This allows changing a polarization direction (a direction of a polarization axis) of a linearly polarized light that has passed through the display liquid crystal panel or the viewing-angle-control liquid crystal panel. This makes it possible to change a viewing restricted direction set by the viewing-angle-control panel. That is, an appropriate retardation member is employed and an axis of the retardation member is set as appropriate. This makes it possible to appropriately set the viewing restricted direction in the case of a narrow viewing characteristic operation.

The liquid crystal display device may have an arrangement in which: the display liquid crystal panel includes a first polarizing member, a display liquid crystal cell, and a second polarizing member overlapped in this order, and the viewing-angle-control liquid crystal panel includes a third polarizing member, a viewing-angle-control liquid crystal cell, and a fourth polarizing member overlapped in this order; and the retardation member is provided between the second polarizing member and the third polarizing member.

The retardation member may be a half wavelength plate (½λ plate). In this case, the second and third polarizing members are provided so that an angle between a transmission axis of the second polarizing plate and an axis of the half wavelength plate becomes equal to an angle between the axis of the half wavelength plate and a transmission axis of the third polarizing plate. According to the arrangement, a polarization direction (a direction of a polarization axis) of a linearly polarized light that has passed through the display liquid crystal panel can be changed while an intensity of the linearly polarized light is kept the same.

The retardation member may be arranged by two ¼ wavelength plates provided in parallel (so that axes of the ¼ wavelength plate become parallel to each other).

The liquid crystal display device may further include: a retardation plate at least either between the first polarizing member and the display liquid crystal cell or between the second polarizing member and the display liquid crystal cell. Moreover, the liquid crystal display device may further include: a retardation plate at least either between the third polarizing member and the viewing-angle-control liquid crystal cell or between the fourth polarizing member and the viewing-angle-control liquid crystal cell. In this way, the retardation plate is provided between a polarizing plate and a liquid crystal cell. This makes it possible to perform optical compensation of an elliptically polarized light. This elliptically polarized light is produced by birefringence that is caused by the liquid crystal cell.

The liquid crystal display device may be provided with a backlight and the display liquid crystal panel provided between the backlight and the viewing-angle-control liquid crystal panel. Moreover, the liquid crystal display device may be provided with a backlight and the viewing-angle-control liquid crystal panel provided between the backlight and the display liquid crystal panel.

In the liquid crystal display device, it is preferable that the light emitted from a backlight has directivity.

A viewing angle control module of the present invention constituting a liquid crystal display device capable of switching, in combination with a display liquid crystal panel, viewing angle characteristics, the viewing angle control module includes: a retardation member for setting a viewing restricted direction and a viewing-angle-control liquid crystal panel which are provided in this order from a side provided with the display liquid crystal panel.

The arrangement makes it possible to change, by use of the retardation member, a polarization direction (a direction of a polarization axis) of the linearly polarized light that has passed through the display liquid crystal panel or the viewing-angle-control liquid crystal panel. As a result, a viewing restricted direction set by the viewing-angle-control liquid crystal panel can be changed. That is, by using an appropriate retardation member and setting an axis of the retardation member appropriately, a viewing restricted direction can be set as appropriate.

In the viewing angle control module, the viewing-angle-control liquid crystal panel may include a first polarizing member, a viewing-angle-control liquid crystal cell, and a second polarizing member overlapped in this order.

In the viewing angle control module, the retardation member may be a half wavelength plate. In this case, an angle between a polarization axis of light that enters the viewing angle control module or exits from the viewing angle control module and an axis of the half wavelength plate is arranged to be equal to an angle between the axis of the half wavelength plate and a transmission axis of the first polarizing plate. According to the arrangement, a polarization direction (a direction of a polarization axis) of a linearly polarized light that has passed through the display liquid crystal panel can be changed while an intensity of the linearly polarized light is kept the same.

The retardation member may be arranged by two ¼ wavelength plates provided in parallel.

As described above, according to the liquid crystal display device of the present invention, an appropriate retardation member (for example, a ½ wavelength plate) is provided between the display liquid crystal panel and the viewing-angle-control liquid crystal panel. This makes it possible to change a polarization direction (a direction of a polarization axis) of a linearly polarized light that has passed through a display. As a result, a viewing restricted direction can be set as appropriate in the case of a narrow viewing angle characteristic operation.

REFERENCE NUMERALS

1 Display Liquid Crystal Panel
2 Viewing-Angle-Control Liquid Crystal Panel
3 Backlight
7 Setting Retardation Plate (λ/2 Plate, Retardation Member)
10 Liquid Crystal Display Device
11 Liquid Crystal Cell
12 Second Polarizing Plate
13 First Polarizing Plate
21 Liquid Crystal Cell 22 Fourth Polarizing Plate
23 Third Polarizing Plate
24 Retardation Plate
25 Retardation Plate
49 Viewing Angle Control Module
77a λ/4 Plate (Retardation Member)
77b λ/4 Plate (Retardation Member)
$X_{12}$ Transmission Axis
$X_{22}$ Transmission Axis
$X_{23}$ Transmission Axis
A Axis of Setting Retardation Plate (λ/2 Plate)

BEST MODE FOR CARRYING OUT THE INVENTION

The following explains one embodiment of the present invention, with reference to FIGS. 1 through 17.

Figure 3:
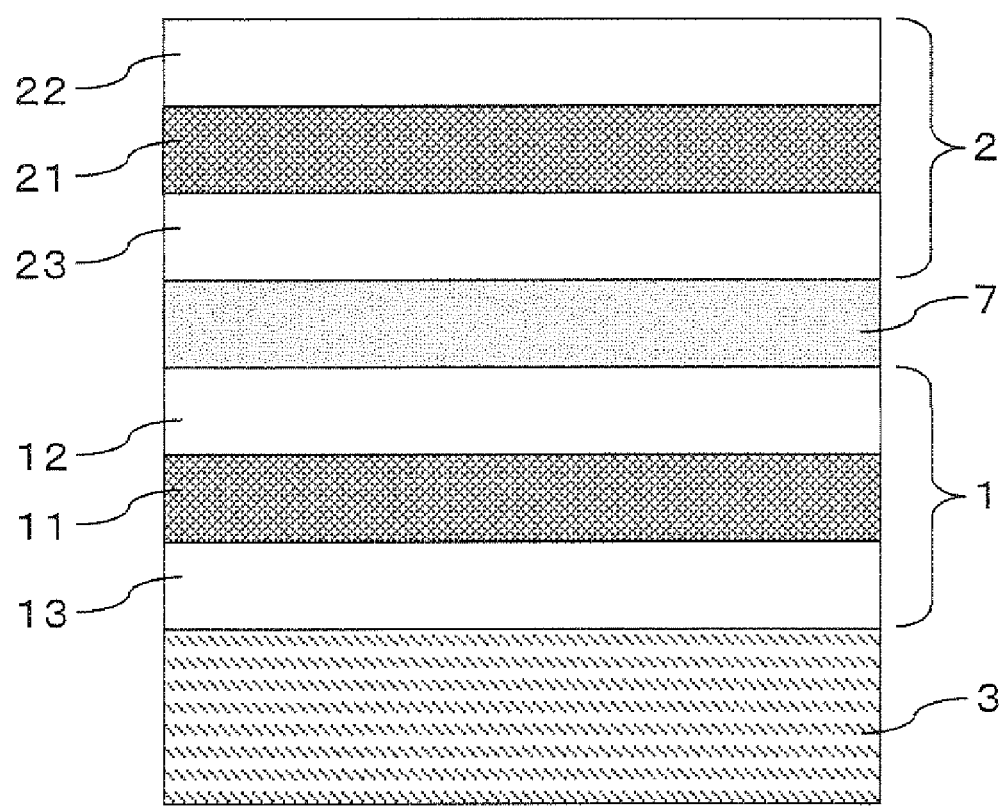
FIG. 3 is a cross sectional view illustrating an arrangement an arrangement of the liquid crystal display device of the present invention.

FIG. 3 is a cross sectional view schematically illustrating a liquid crystal display device 10 of the present invention. As illustrated in FIG. 3, the liquid crystal display device 10 includes a display liquid crystal panel 1 that displays an image, a viewing-angle-control liquid crystal panel 2 that switches viewing angle characteristics of the liquid crystal display device 10, a setting retardation plate (½λ plate) 7 that is provided between the display liquid crystal panel 1 and the viewing-angle-control liquid crystal panel 2 for setting a viewing restricted direction, and a backlight 3.

In the display liquid crystal panel 1, a first polarizing plate 13, a display liquid crystal cell 11 in which a liquid crystal is sandwiched by a pair of light-transmitting substrates, and a second polarizing plate 12 are provided in this order. In the viewing-angle-control liquid crystal panel 2, a third polarizing plate 23, a viewing-angle-control liquid crystal cell 21 in which a liquid crystal is sandwiched by a pair of light-transmitting substrates are provided in this order. The setting retardation plate 7 is provided between the second polarizing plate 12 and the third polarizing plate 23.

The liquid crystal display device 10 can take a wide viewing angle mode (wide viewing angle characteristic) and a narrow viewing angle mode (narrow viewing angle characteristic), by a switching operation of the liquid crystal provided in the viewing-angle-control liquid crystal cell 21. In the wide viewing angle mode, an image of the display liquid crystal panel 1 can be viewed from a larger number of viewing points. In the narrow viewing angle mode, the image of the display liquid crystal panel can be viewed from only a limited viewing point. The narrow viewing angle mode is suitable in a case where it is unfavorable that the image of the display liquid crystal panel 1 is viewed by others. Meanwhile, the wide viewing angle mode is suitable, for example, in general use or in a case where an image of the display liquid crystal panel 1 is desired to be viewed simultaneously by a plurality of people.

A liquid crystal mode, a cell structure, and a driving mode of the display liquid crystal panel 1 may be determined as appropriate. That is, any liquid crystal panel (for example, a TN liquid crystal panel or an ASV liquid crystal panel) capable of displaying a character, an image, or a moving image may be used as the display liquid crystal panel 1. The display liquid crystal panel 1 may also be a semi-transmissive liquid crystal panel. Further, the display liquid crystal panel 1 may be a panel capable of performing color display or a panel exclusive to monochrome display. An arrangement of the backlight 3 is also determined as appropriate. For example, the backlight 3 may be a backlight that emits light having directivity.

A liquid crystal layer of the viewing-angle-control liquid crystal cell 21 is made of, for example, a positive nematic liquid crystal in a homogenous alignment. A surface of the second polarizing plate 12 may be subjected to a diffusion treatment such as an AG treatment. The first polarizing plate 13 is a so-called a clear polarizing plate that is not subjected to a surface treatment.

With reference to FIGS. 12(a) and 12(b), an arrangement and an operation of the viewing-angle-control liquid crystal panel 2 are explained. FIGS. 12(a) and 12(b) are diagrams each schematically illustrating mainly an arrangement of the viewing-angle-control liquid crystal panel 2. FIG. 12(a) shows an alignment state of a liquid crystal molecule of the viewing-angle-control panel in the narrow viewing angle mode. FIG. 12(b) shows an alignment state of a liquid crystal molecule of the viewing-angle-control panel in the wide viewing angle mode.

As illustrated in FIGS. 12(a) and 12(b), the viewing-angle-control liquid crystal cell 21 includes a pair of light-transmitting substrates 21a and 21b. On surfaces of the light-transmitting substrates 21a and 21b, transparent electrodes (not illustrated) are formed by use of, for example, ITO (Indium Tin Oxide), respectively. Because the display liquid crystal cell 11 needs to drive a liquid crystal for each display unit such as a pixel unit or a segment unit, the display liquid crystal cell 11 has an electrode structure in accordance with the display unit. On the other hand, an electrode arrangement of the viewing-angle-control liquid crystal cell 21 is not limited. The viewing-angle-control liquid crystal cell 21 may have, for example, an arrangement in which uniform electrodes are formed on an entire surface of each of the light-transmitting substrates 21a and 21b for carrying out uniform switching all over a display surface or other appropriate electrode arrangement.

On an upper layer of the transparent electrode, an alignment film (not illustrated) is formed. This alignment film aligns liquid crystal molecules 21c. The alignment film is subjected to a rubbing treatment according to a publicly known method. Arrows Ra and Rb in FIGS. 12(a) and 12(b) shows rubbing directions of the light-transmitting substrates 21a and 21b, respectively. As illustrated in FIGS. 12(a) and 12(b), the rubbing direction Ra with respect to the alignment film of the light-transmitting substrate 21a is substantially parallel and in a reverse direction with respect to the rubbing direction Rb with respect to the alignment film of the light-transmitting substrate 21b.

In other words, the viewing-angle-control liquid crystal device 21 (hereinafter, referred to as a liquid crystal cell 21 as appropriate) is a so-called parallel cell that has a twist angle of 0 (no twist). In the present embodiment, the liquid crystal provided in the liquid crystal cell 21 is a liquid crystal in a homogenous alignment. Accordingly, each of the liquid crystal molecules 21c of the liquid crystal cell 21 is aligned so that a long molecular axis becomes parallel to a substrate surface of each of the substrates 21a and 21b at the time when no voltage is applied. A retardation value d·Δn (d is a thickness of the cell, and Δn is a birefringence) of the liquid crystal layer of the liquid crystal cell 21 is, for example, in a range of 350 nm to 450 nm.

When a voltage is applied between electrodes (not illustrated) that are provided on the light-transmitting substrates 21a and 21b, respectively, the liquid crystal molecules 21c gradually changes a direction according to a size of the applied voltage. The liquid crystal molecule 21c changes direction from a state parallel to the substrate surface, within a plane that is perpendicular to a normal of each of the light-transmitting substrates 21a and 21b as illustrated in FIG.

Figure 12:
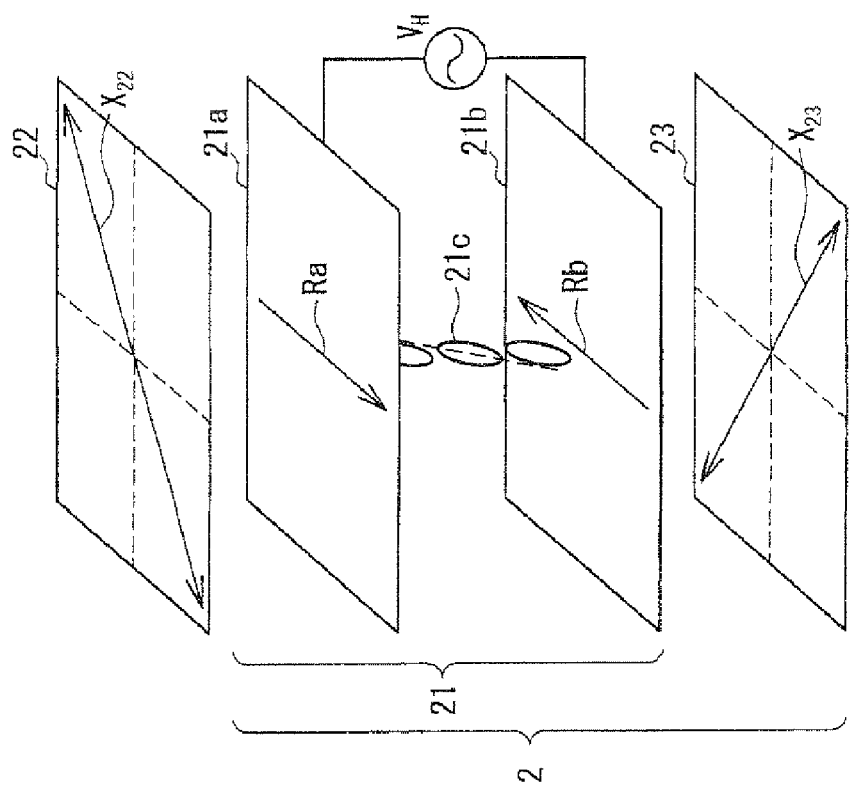
FIG. 12(a) is a perspective view illustrating an alignment state of a liquid crystal molecule of the viewing-angle-control panel in a narrow viewing angle mode.
FIG. 12(b) is a perspective view illustrating an alignment state of a liquid crystal molecule of the viewing-angle-control panel in a wide viewing angle mode.
Figure 12:
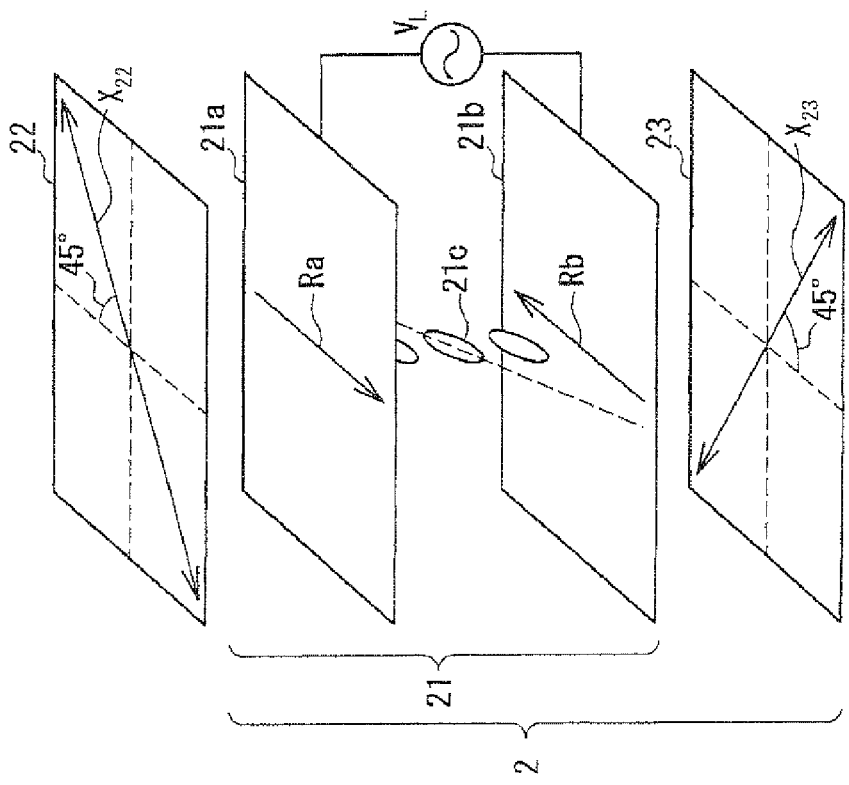

12(*a*) and parallel to the respective rubbing directions Ra and Rb with respect to the alignment films of the light-transmitting substrates 21*a* and 21*b*. When the applied voltage reaches a predetermined value, the liquid crystal molecule 21*c* is oriented in a state in which the long molecular axis is substantially perpendicular to the substrate surface of each of the light-transmitting substrates 21*a* and 21*b*. That is, FIG. 12(*a*) shows a state in which the long molecular axis of the liquid crystal molecule 21*c* is slightly tilted with respect to the normal of each of the light-transmitting substrate 21*a* and 21*b* due to an applied voltage $V_L$ (a voltage in a range of, for example, approximately 2.5 V to 3.5 V). FIG. 12(*b*) shows a state in which the long molecular axis of the liquid crystal molecule 21*c* is substantially perpendicular with respect to the substrate surface of each of the light-transmitting substrate 21*a* and 21*b* due to an applied voltage $V_H$ (a voltage, for example, not less than 5.0 V).

As illustrated in FIG. 12(*a*), in the viewing-angle-control panel 2, the third polarizing plate 23 provided below the liquid crystal cell 21 and the fourth polarizing plate 22 provided above the liquid crystal cell 21 are provided so that a transmission axis $X_{23}$ of the polarizing plate 22 and a transmission axis $X_{22}$ of the polarizing plate 23 become substantially orthogonal.

In a case where the transmission axis $X_{23}$ and the transmission axis $X_{22}$ are arranged to be substantially orthogonal in this way (that is, an angle between the transmission axis $X_{22}$ and the transmission axis $X_{23}$ is in a range of 800 to 100°), a sufficient effect can be obtained from switching viewing angles. The transmission axis $X_{22}$ of the fourth polarizing plate 22 keeps tilt at an angle in a range of 40° to 50° (preferably 45°).

Figure 13:
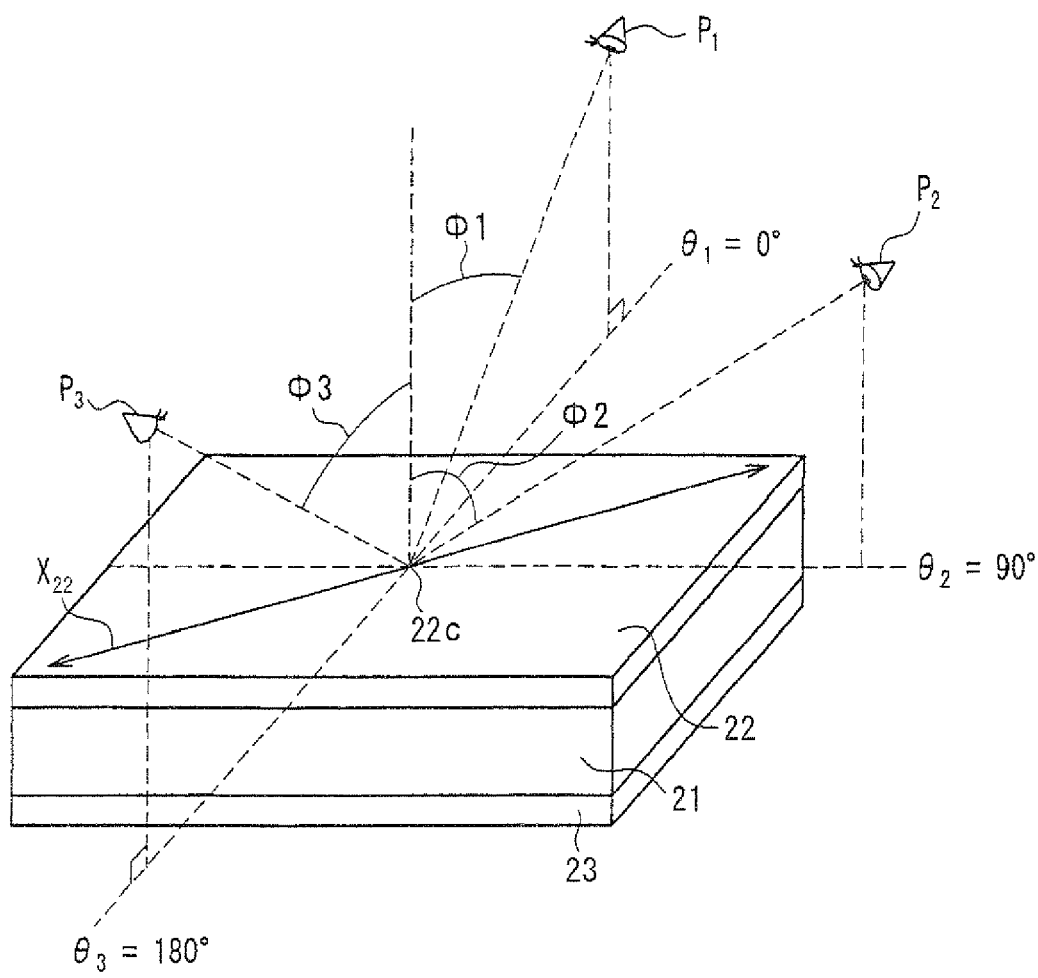
FIG. 13 is a diagram that expresses, in two angles (a polar angle and an azimuth angle), a plurality of viewing points with respect to the viewing-angle-control panel provided in the same direction as the viewing-angle-control panel in each of FIGS. 12(a) and 12(b), and schematically explains each of the plurality of viewing points.
Figure 14:
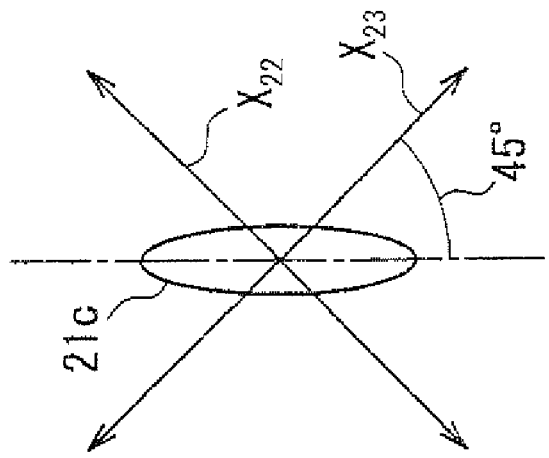
FIG. 14(a) is a diagram illustrating a positional relationship between a liquid crystal molecule and a transmission axis of a polarizing plate in a case where the viewing-angle-control panel is viewed from a viewing point $P_1$.
FIG. 14(b) is a diagram illustrating a positional relationship between the liquid crystal molecule and the transmission axis of the polarizing plate in a case where the viewing-angle-control panel is viewed from a viewing point $P_2$.
FIG. 14(c) is a diagram illustrating a positional relationship between the liquid crystal molecule and the transmission axis of the polarizing plate at the time when the viewing-angle-control panel are viewed from a viewing point $P_3$.
Figure 14:
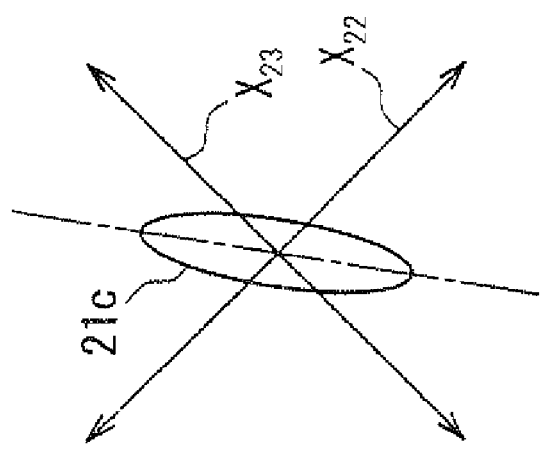
Figure 14:
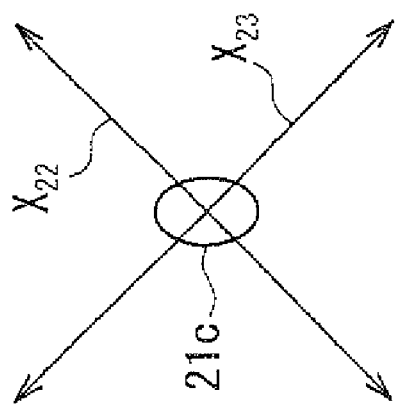

Here, with reference to FIG. 13 and FIGS. 14(*a*) through 14(*c*), in addition to the above-explained FIGS. 12(*a*) and 12(*b*), the following explains a principle of switching the viewing angle characteristics of the liquid crystal display device 10 between the wide viewing angle mode and the narrow viewing angle mode, by using the viewing-angle-control panel 2. In the following explanation, a viewing point with respect to the viewing-angle-control panel 2 is expressed in an azimuth angle $\theta$ and a polar angle $\phi$ that use a center of the fourth polarizing plate 22 as a reference. Here, the azimuth angle $\theta$ is a rotational angle of a line connecting between a center 22*c* of the fourth polarizing plate 22*a* and a point at which a perpendicular line from a viewing point to a plane including a surface of the fourth polarizing plate 22 intersects with the plane. The polar angle $\phi$ is an angle between a line connecting the center 22*c* of the fourth polarizing plate 22 with the viewing point and a normal of the fourth polarizing plate 22.

FIG. 13 shows three viewing points $P_1$ through $P_3$ with respect to the viewing-angle-control panel 2 that is provided in the same direction as that in FIGS. 12(*a*) and 12(*b*). The azimuth angle $\theta$ increases clockwise in a case where the viewing-angle-control panel 2 is viewed from an upper side in a normal direction of the fourth polarizing plate 22, on an assumption that the azimuth angle of the viewing point $P_1$ is 0°. As illustrated in FIG. 13, the viewing point $P_1$ is expressed in the azimuth angle $\theta_1=0°$ and the polar angle=$\phi1$. The viewing point $P_2$ is expressed in the azimuth angle $\theta_2=90°$ and the polar angle=$\phi2$. The viewing point $P_3$ is expressed in the azimuth angle $\theta_3=180°$ and the polar angle=$\phi3$.

Figure 15:
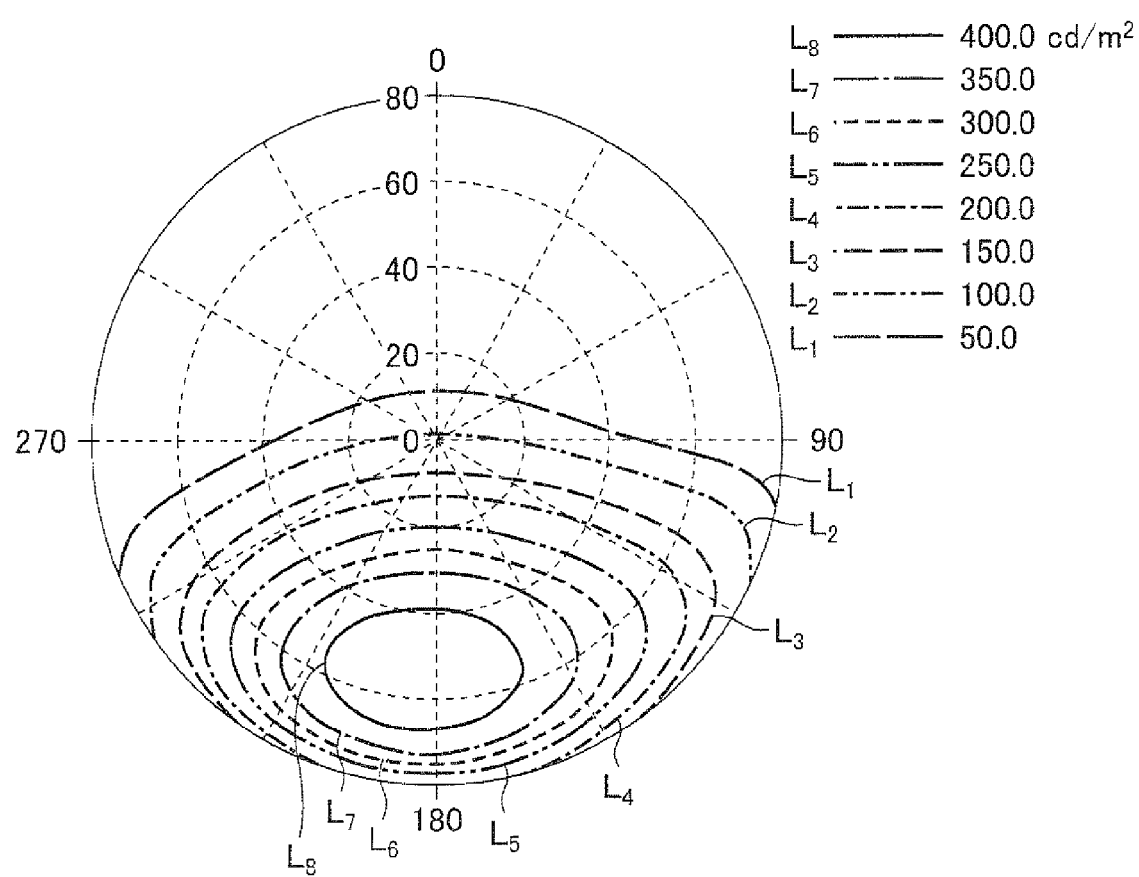
FIG. 15 is a chart illustrating a viewing angle characteristic (dependency of luminance distribution on the polar angle and the azimuth angle) in the narrow viewing angle mode.
Figure 16:
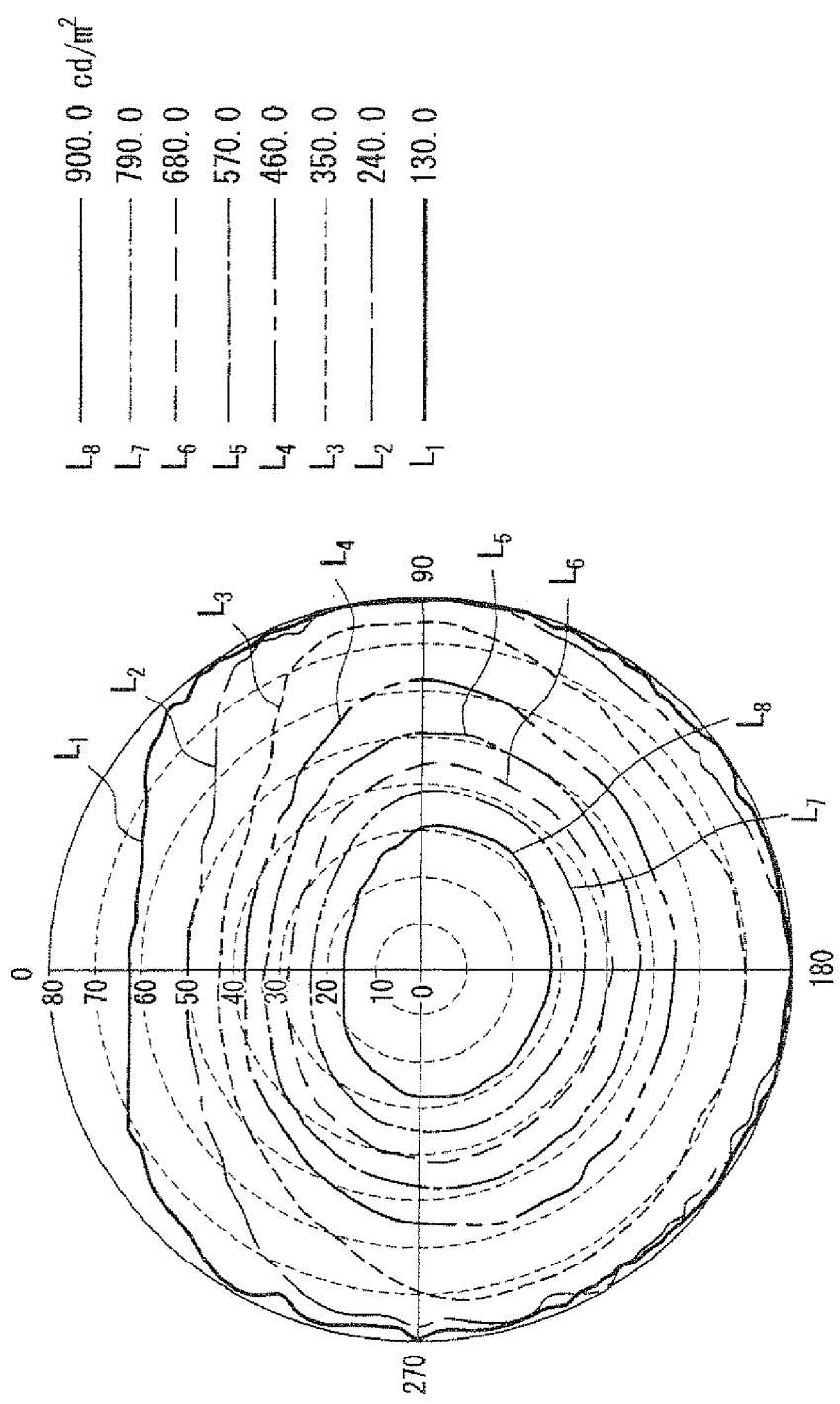
FIG. 16 is a chart illustrating a viewing angle characteristic (dependency of luminance distribution on the polar angle and the azimuth angle) in the wide viewing angle mode.

With reference to FIGS. 14(*a*) through 14(*c*), the following explains display states that are observed from the viewing points $P_1$ through $P_3$ shown in FIG. 13, respectively, in a case where the long molecular axis of the liquid crystal molecule 21*c* is tilted, due to the applied voltage $V_L$ that is applied to the liquid crystal cell 21, at a slight angle with respect to the normal of each of the light-transmitting substrates 21*a* and 21*b* (in the case of FIG. 12(*a*)). FIG. 15 is a chart illustrating a viewing angle characteristic (dependency of luminance distribution on the polar angle and the azimuth angle) in the narrow viewing angle mode. FIG. 16 is a viewing angle characteristic (dependency of luminance distribution on the polar angle and the azimuth angle) in the wide viewing angle mode.

When the viewing-angle-control panel 2 is viewed from the viewing point $P_1$ (azimuth angle $\theta_1=0°$ and polar angle=$\phi1$) of FIG. 13, the liquid crystal molecule 21*c* is, as illustrated in FIG. 14(*a*), in a state in which the long molecular axis of the liquid crystal molecule 21*c* is in parallel to a viewing point direction (a direction from the viewing point to the molecule). Consequently, a linearly polarized light that passes through the third polarizing plate 23 and enters the liquid crystal cell 21 toward the viewing point $P_1$ is not given birefringence by the liquid crystal molecule 21*c*. As a result, the fourth polarizing plate 22 shields the linearly polarized light. Accordingly, a display viewed from the viewing point $P_1$ becomes a black display. In a case where the applied voltage $V_L$ that is applied to the liquid crystal cell 21 is in a range of approximately 2.5 V to 3.5 V, a sufficient light-shielding state for preventing others from peeking at the display is obtained, as illustrated in FIG. 15, at the polar angle $\phi$ in a range of approximately $30°\leq\phi<90°$ in the case of the azimuth angle $\theta_1=0°$. In other words, a direction expressed in the azimuth angle $\theta_1=0°$ with respect to the center 22*c* of the fourth polarizing plate 22 becomes a viewing restricted direction.

$L_1$ through $L_8$ in FIG. 15 are equipotential lines that show distribution of viewing angles that have luminances of 50 cd/m², 100 cd/m², 150 cd/m², 200 cd/m², 250 cd/m², 300 cd/m², 350 cd/m², and 400 cd/m², respectively.

When the viewing-angle-control panel 2 is viewed from the viewing point $P_2$ (azimuth angle $\theta_2=90°$ and polar angle=$\phi2$) of FIG. 13, the liquid crystal molecule 21*c* is, as illustrated in FIG. 14(*b*), in a state in which the long molecular axis of the liquid crystal molecule 21*c* is slightly tilted with respect to each of the transmission axis $X_{22}$ of the third polarizing plate 22 and the transmission axis $X_{23}$ of the third polarizing plate 23. Consequently, a very slight birefringence is produced by the liquid crystal molecule 21*c* in a linearly polarized light that passes through the third polarizing plate 23 and enters the liquid crystal cell 21 toward the viewing point $P_2$. However, the fourth polarizing plate 22 shields the linearly polarized light. Accordingly, a display viewed from the viewing point $P_2$ also becomes a black display. Moreover, a display viewed from a position opposed to the viewing point $P_2$, that is, a display in a case where the azimuth angle $\theta$ is 270°, also becomes a black display, because of the same principle as in the observation from the viewing point $P_2$. In a case where the applied voltage $V_L$ that is applied to the liquid crystal cell 21 is in a range of approximately 2.5 V to 3.5 V, a sufficient light-shielding state for preventing others from peeking at the display is obtained, as illustrated in FIG. 15, at the polar angle $\phi$ in a range of approximately $30°\leq\phi<90°$ in the case of the azimuth angles $\theta=90°$ and 270°. In other words, directions that are expressed in the azimuth angles $\theta_2=90°$ and 270°, respectively, with respect to the center 22*c* of the fourth polarizing plate 22 become viewing restricted directions.

When the viewing-angle-control panel 2 is viewed from the viewing point $P_3$ (azimuth angle $\theta_3=180°$ and polar angle=$\phi3$) of FIG. 13, the liquid crystal molecule 21*c* is, as illustrated in FIG. 14(*c*), in a state in which the long molecular axis of the liquid crystal molecule 21c is tilted at approximately 45° with respect to each of the transmission axis $X_{22}$ of the fourth polarizing plate 22 and the transmission axis $X_{23}$ of the third polarizing plate 23. Further, the short molecular axis of the liquid crystal molecule 21c is in parallel to a viewing point direction (a direction from the viewing point to the molecule). Consequently, birefringence is given by the liquid crystal molecule 21c to a linearly polarized light that passes through the third polarizing plate 23 and enters the liquid crystal cell 21 toward the viewing point $P_3$. This rotates the polarization axis (polarization direction) of the linearly polarized light so that the polarization axis agrees with the transmission axis $X_{22}$ of the fourth polarizing plate 22. As a result, the linearly polarized light passes through the fourth polarizing plate 22. Therefore, a favorable display can be obtained at the viewing point $P_2$. In a case where the applied voltage $V_L$ that is applied to the liquid crystal cell 21 is in a range of approximately 2.5 V to 3.5 V as described above, a favorable display can be obtained as illustrated in FIG. 15, at the polar angle φ in a range of approximately 0°≦φ<90° in the case of the azimuth angle $θ_3$=180°. In other words, a direction that is expressed in the azimuth angle $θ_3$=180° with respect to the center 22c of the fourth polarizing plate 22 becomes a viewing restricted direction.

As explained above, when the applied voltage $V_L$ is applied to the liquid crystal cell 21 of the viewing-angle-control liquid crystal panel 2 which applied voltage $V_L$ tilts the long molecular axis of the liquid crystal molecule 21c at a slight angle with respect to a substrate normal (in the case of FIG. 12(a)), a favorable display is obtained only at the azimuth angle θ in a narrow range around 180°. In other azimuth angles, the polarized light in the liquid crystal cell 21 is shielded by the fourth polarizing plate 22, and the display becomes a black display. That is, the liquid crystal display device 10 can be arranged to be in the narrow viewing angle mode in which the image of the display liquid crystal panel 1 is viewed from only a limited viewing point.

On the other hand, when, as illustrated in FIG. 12(b), an applied voltage $V_H$ is applied to the liquid crystal cell 21 of the viewing-angle-control panel 2 which applied voltage $V_H$ tilts the long molecular axis of the liquid crystal molecule 21c to substantially perpendicular to the substrate, sufficient birefringence that provides a favorable display occurs in light traveling towards any of the viewing points $P_1$ through $P_3$ as illustrated in FIG. 13. In other words, as illustrated in FIG. 16, substantially all azimuth angles θ with respect to the center 22c of the fourth polarizing plate 22 become viewing allowing directions. This allows arranging the liquid crystal display device 10 to be in the wide viewing angle mode in which the image of the display liquid crystal panel 1 can be viewed from a larger number of viewing points. $L_1$ through $L_8$ in FIG. 16 are equipotential lines that show distribution of viewing angles that have luminances of 130 cd/m$^2$, 240 cd/m$^2$, 350 cd/m$^2$, 460 cd/m$^2$, 570 cd/m$^2$, 680 cd/m$^2$, 790 cd/m$^2$, and 900 cd/m$^2$, respectively.

In this way, in the liquid crystal display device 10 of the present embodiment, a voltage that is to be applied to the liquid crystal cell 21 of the viewing-angle-control panel 2 is switched at least between two stages of the applied voltage $V_H$ and the applied voltage $V_L$. This makes it possible to switch the viewing angle characteristics of the liquid crystal display device 10 between the wide viewing angle mode and the narrow viewing angle mode.

Figure 4:
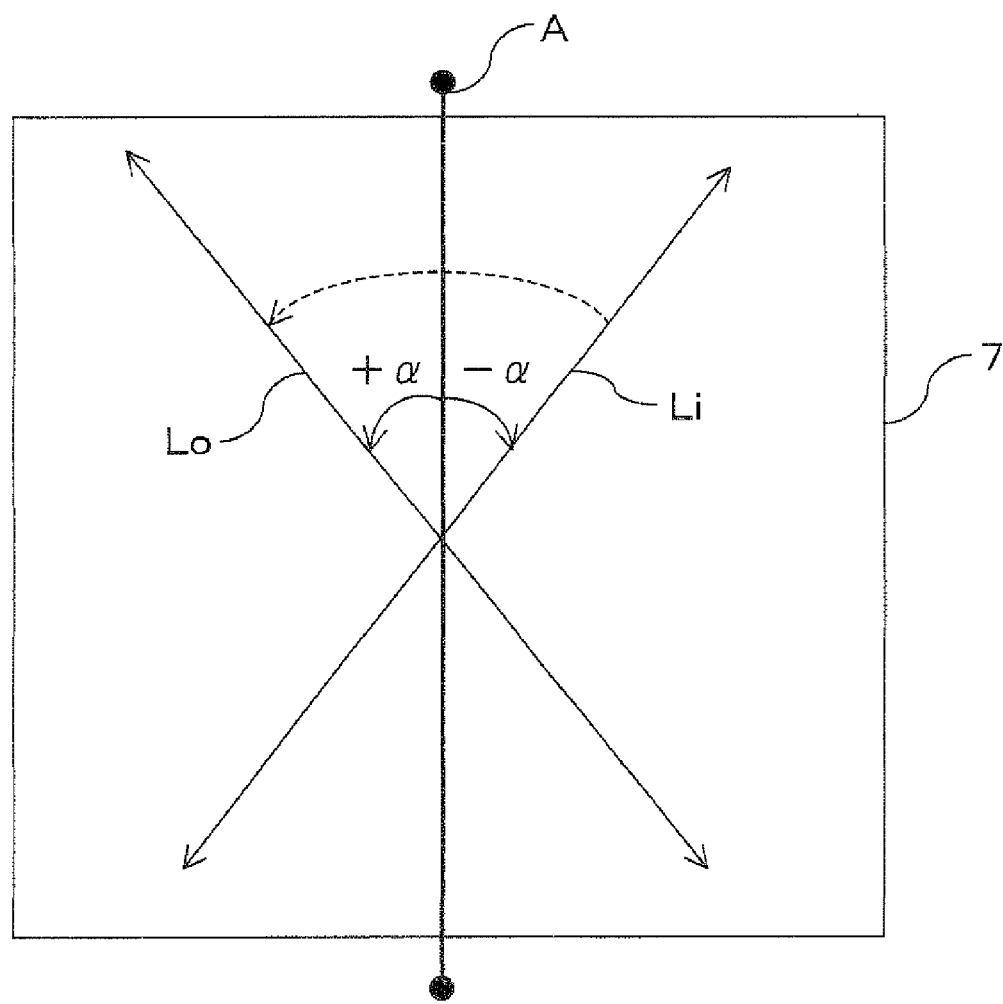
FIG. 4 is a diagram schematically illustrating an effect of a λ/2 plate.

In the liquid crystal display device 10, a direction of the transmission axis $X_{23}$ of the third polarizing plate 23 is set as appropriate by providing the setting retardation plate 7. This allows the viewing restricted direction in the narrow viewing angle mode to be set as appropriate. Here, the setting retardation plate 7 is a ½λ (wavelength) plate. In a case where the linearly polarized light decomposed into two component sign waves is considered, the setting retardation plate 7 has an effect to shift, by half a wavelength (180 degrees), a phase of one component of the linearly polarized light that is entered. In other words, as illustrated in FIG. 4, the setting retardation plate 7 can convert linearly polarized light Li having a polarization axis that has an angle of −α with respect to an axis A of the setting retardation plate 7 into linearly polarized light Lo having a polarization axis that has an angle of +α with respect to the axis A of the setting retardation plate 7. In this conversion, an intensity of the linearly polarized light Li is not changed. This makes it possible to set a direction of the transmission axis of the third polarizing plate 23 as appropriate, by changing an angle of the axis of the setting retardation plate 7 with respect to the transmission axis of the second polarizing plate 12.

Figure 2:
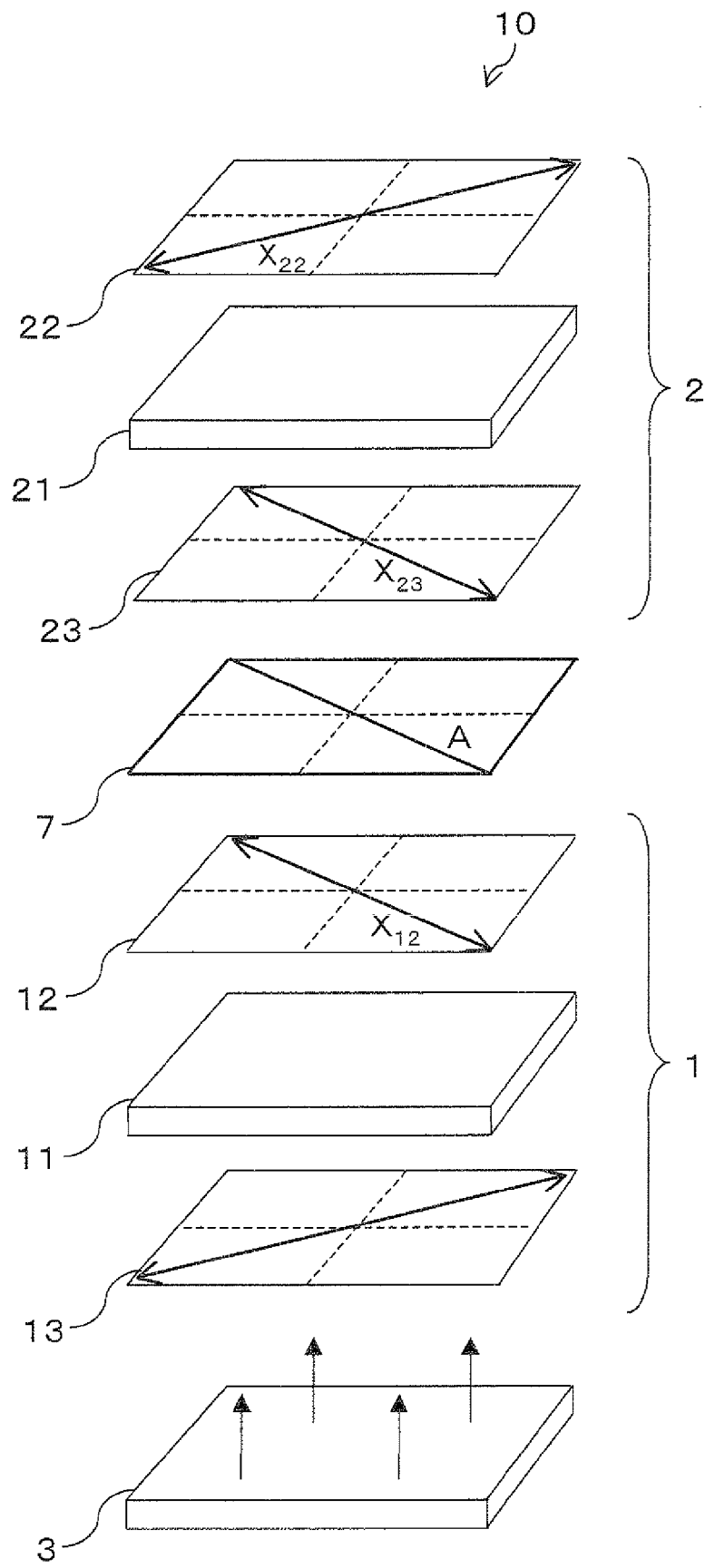
FIG. 2 is an exploded perspective view illustrating an example of an arrangement of the liquid crystal display device of the present invention.
Figure 6:
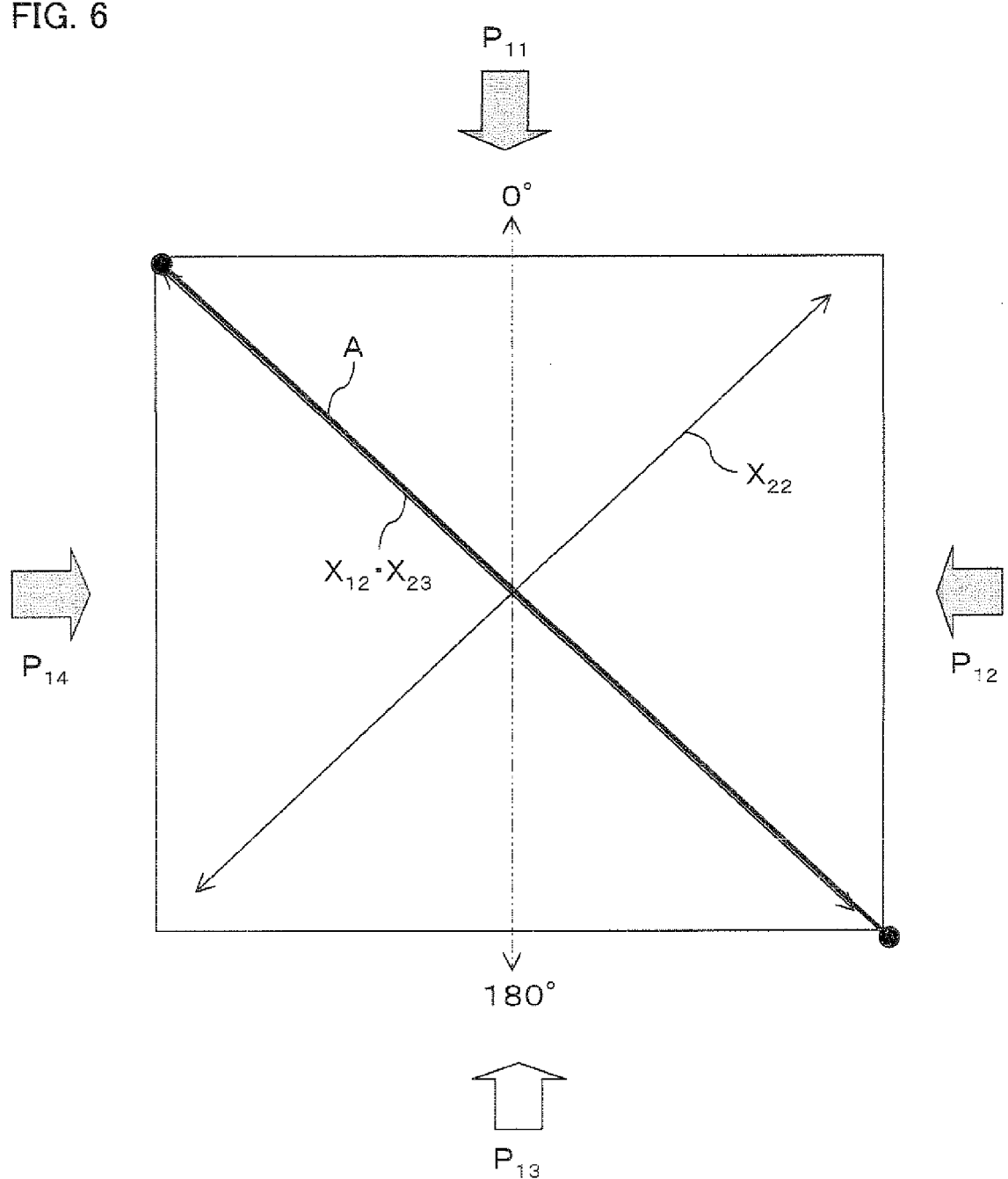
FIG. 6 is a diagram schematically illustrating an effect of a setting retardation plate.

For example, as illustrated in FIG. 6, an angle of the axis A of the setting retardation plate 7 with respect to the transmission axis $X_{12}$ of the second polarizing plate 12 is 0 degree, the transmission axis $X_{23}$ of the third polarizing plate 23 can be arranged to be at 0 degree with respect to the transmission axis $X_{12}$ of the second polarizing plate 12. Moreover, because the transmission axis $X_{23}$ of the third polarizing plate 23 and the transmission axis $X_{22}$ of the fourth polarizing plate 22 are substantially orthogonal, the transmission axis $X_{22}$ of the fourth polarizing plate 22 is in the same manner as the transmission axis $X_{22}$ as illustrated in FIG. 13. Accordingly, in the narrow viewing angle mode, directions of the viewing points P11 (azimuth angle 0°), P12 (azimuth angle 90°), and P14 (azimuth angle 270°) become viewing restricted directions. The display from each of these viewing points becomes a black display. On the other hand, a favorable display can be obtained in the viewing point P13 (azimuth angle 180°). An entire arrangement of the liquid crystal display device 10 in this case is illustrated in FIG. 2. As illustrated in FIG. 2, the setting retardation plate 7 is provided so that the axis A of the setting retardation plate 7 becomes parallel to the transmission axis $X_{12}$ of the second polarizing plate 12. This makes it possible to set the transmission axis $X_{23}$ of the third polarizing plate 23 to be parallel to the transmission axis $X_{12}$ of the second polarizing plate 12. Moreover, the fourth polarizing plate 22 is provided so that the transmission axis $X_{22}$ of the fourth polarizing plate 22 intersects substantially orthogonally to the transmission axis $X_{23}$ of the third polarizing plate 23.

Figure 1:
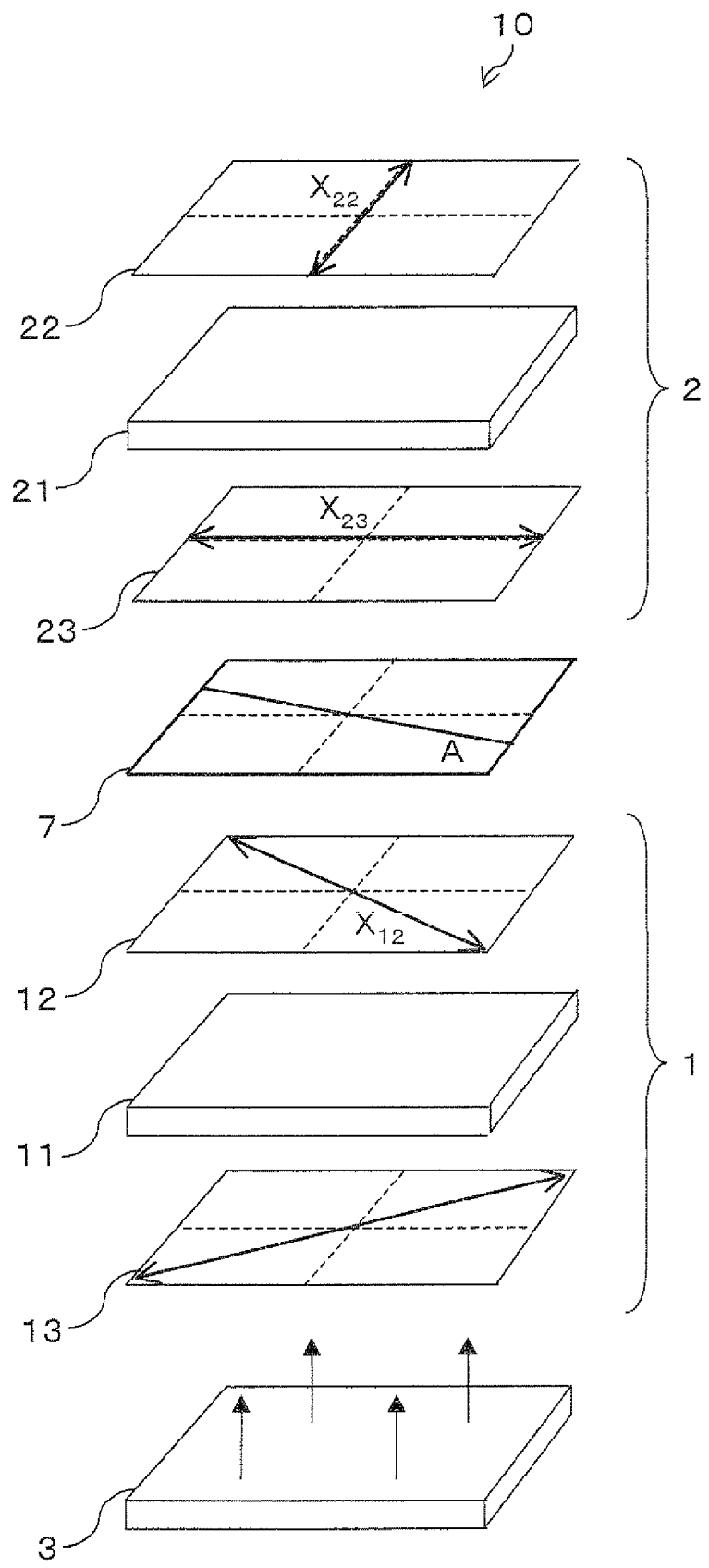
FIG. 1 is an exploded perspective view illustrating an example of an arrangement of a liquid crystal display device of the present invention.
Figure 5:
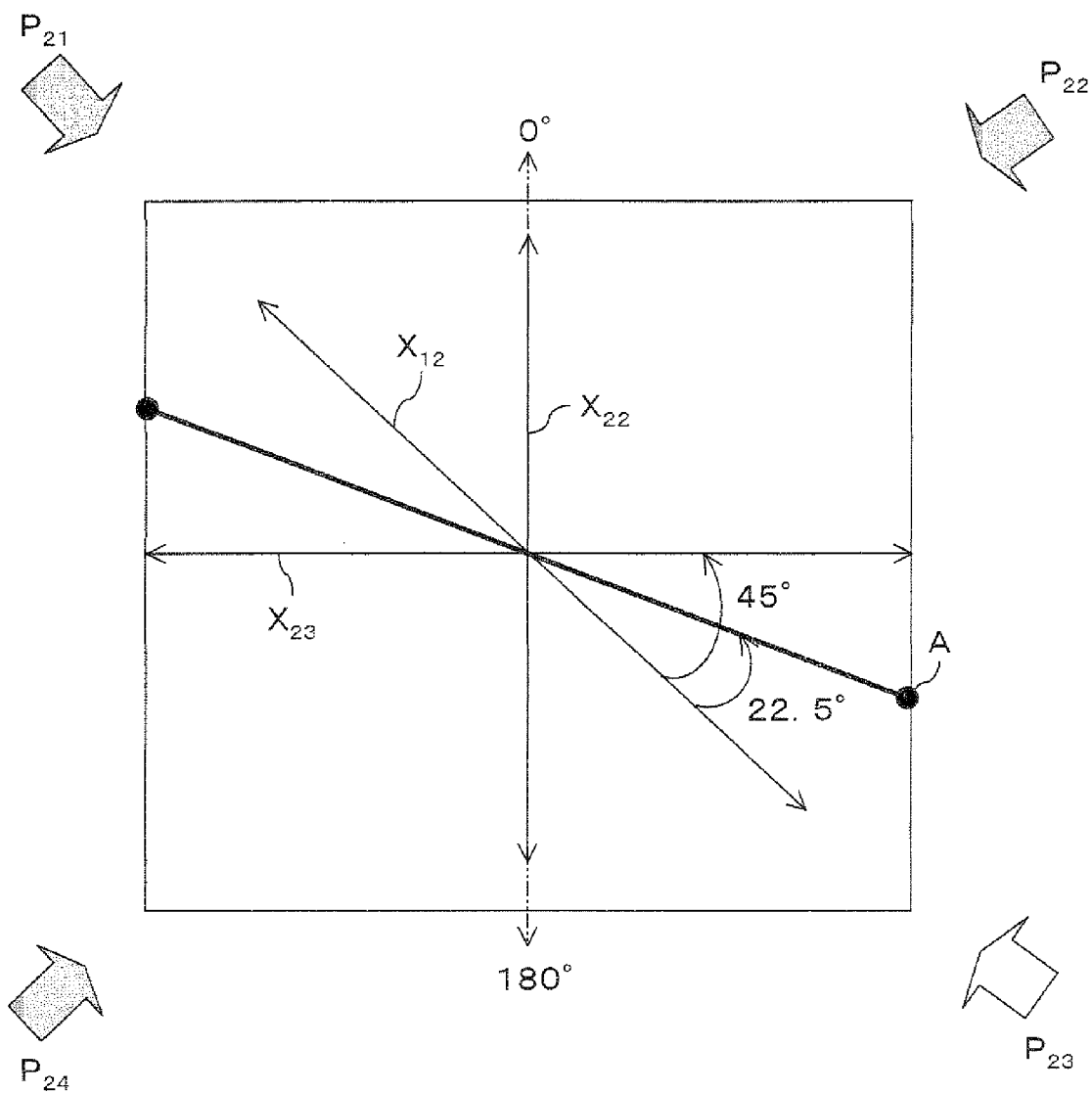
FIG. 5 is a diagram schematically illustrating an effect of a setting retardation plate.

In a case where, as illustrated in FIG. 5, an angle the axis A of the setting retardation plate 7 with respect to the transmission axis $X_{12}$ of the second polarizing plate 12 is set to +22.5 degrees, a direction of the transmission axis $X_{23}$ of the third polarizing plate 23 can be set to +45 degrees with respect to the transmission axis $X_{12}$ of the second polarizing plate 12. As a result, directions of the viewing points P22 (azimuth angle 45°), P24 (azimuth angle 225°), and P21 (azimuth angle 315°) become viewing restricted directions. In each of these viewing points, the display becomes a black display. On the other hand, a favorable display can be obtained at the viewing point P23 (azimuth angle 135°). FIG. 1 shows an entire arrangement of the liquid crystal display device 10 of this case. As illustrated in FIG. 1, the setting retardation plate 7 is provided so that an angle of the axis A of the setting retardation plate 7 with respect to the transmission axis $X_{12}$ of the second polarizing plate 12 becomes +22.5 degrees. As a result, the transmission axis $X_{23}$ of the third polarizing plate 23 can be set at an angle of +45 degrees with respect to the transmission axis $X_{12}$ of the second polarizing plate 12. Moreover, the fourth polarizing plate 22 can be provided so that the transmission axis $X_{22}$ of the fourth polarizing plate 22 intersects substantially orthogonally to the transmission axis $X_{23}$ of the third polarizing plate 23.

In this way, the liquid crystal display device 10 can change a polarization direction (a direction of the polarization axis) of a linearly polarized light that has transmitted the display liquid crystal panel 1 by use of the setting retardation plate 7 (½ wavelength plate). This makes it possible to change the viewing restricted direction by the viewing-angle-control liquid crystal panel 2. That is, by setting the axis of the setting retardation plate 7 (½ wavelength plate) as appropriate, the viewing restricted direction can be set as appropriate.

Figure 7:
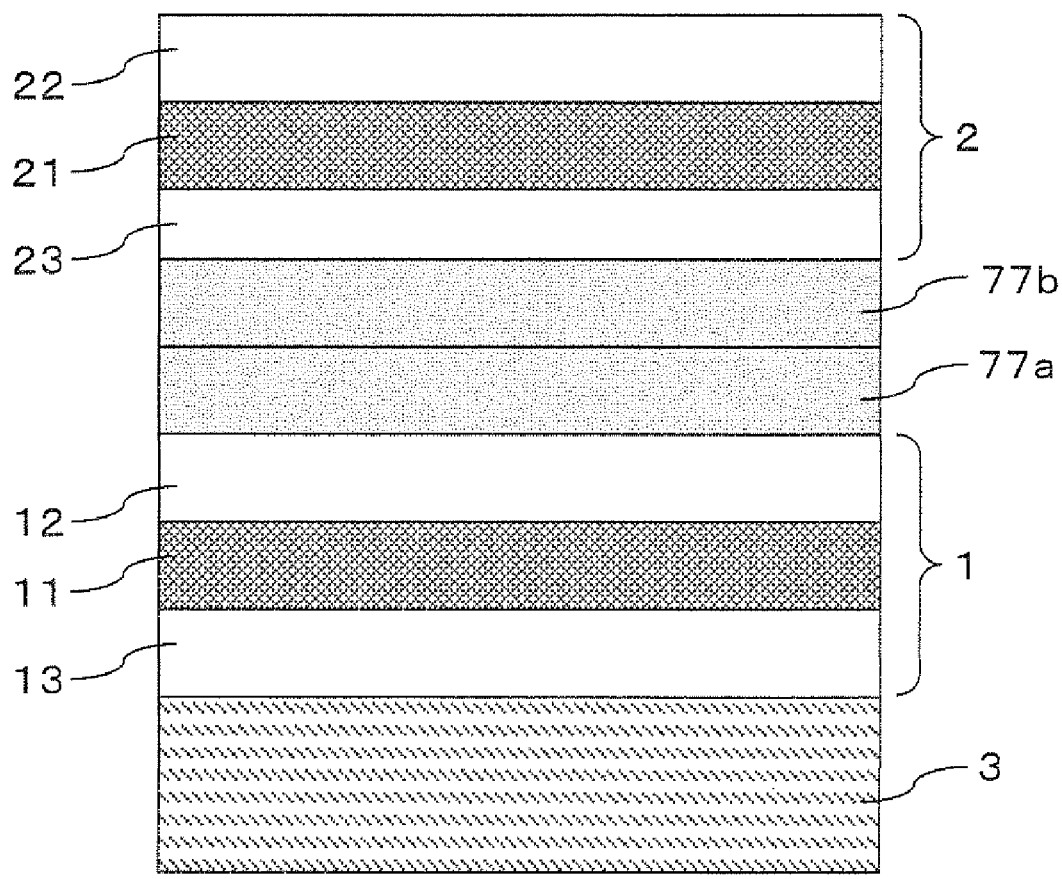
FIG. 7 is a cross sectional view illustrating another arrangement of the liquid crystal display device of the present invention.

In the viewing angle control panel 2 of the liquid crystal display device 10, two λ/4 plates may be provided in lieu of the setting retardation plate 7 (λ/2 plate) as illustrated in FIG. 3. That is, as illustrated in FIG. 7, two λ/4 plates 77a and 77b are provided in parallel to each other (so that axes of the λ/4 plates 77a and 77b become parallel to each other) between the display liquid crystal panel 1 and the viewing-angle-control liquid crystal panel 2.

Figure 8:
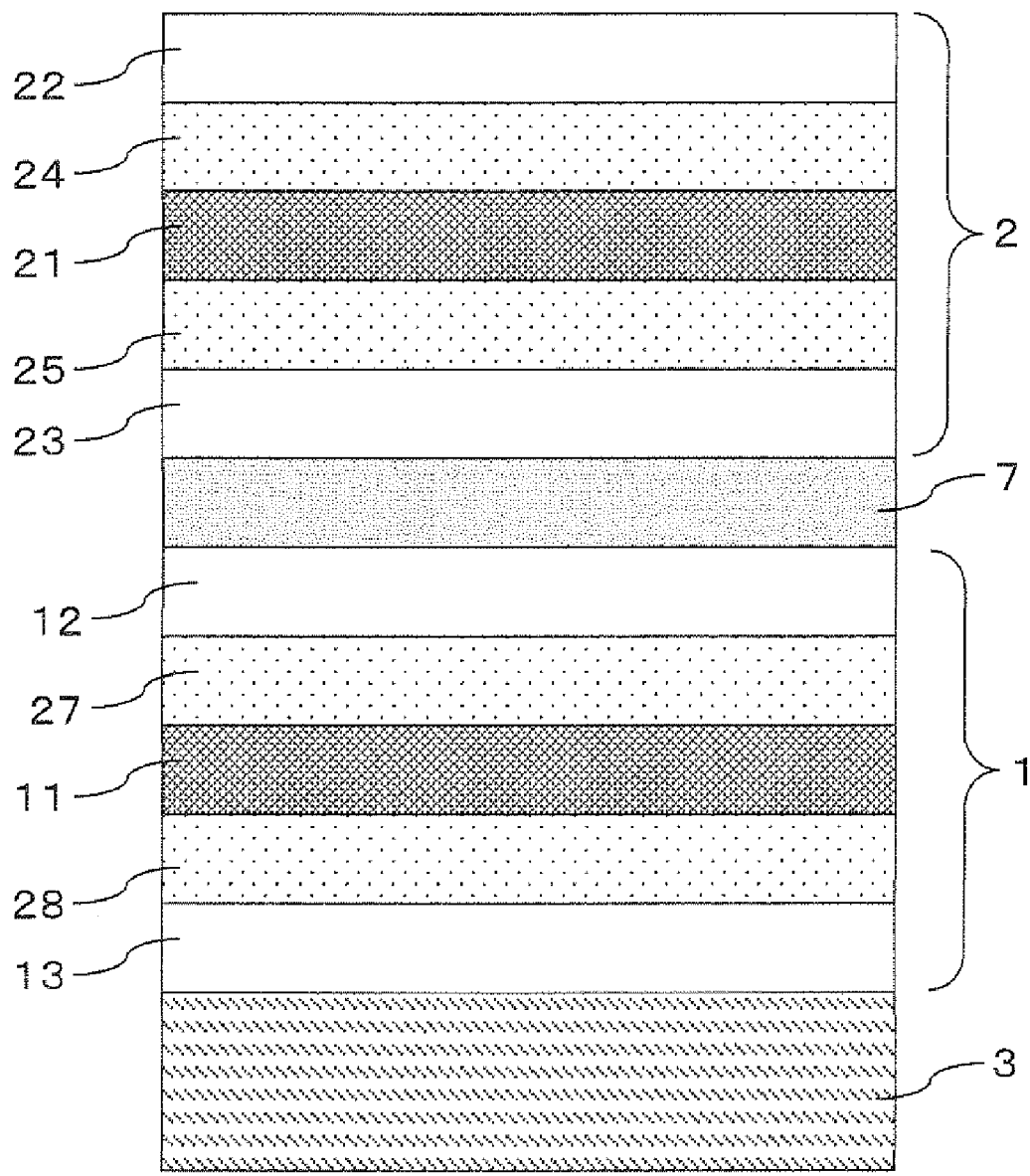
FIG. 8 is a cross sectional view illustrating a modified example of the liquid crystal display device of the present invention.

Alternatively, as illustrated in FIG. 8, in the viewing-angle-control panel 2 of the liquid crystal display device 10, it is possible to provide a retardation plate 25 between the third polarizing plate 23 and the liquid crystal cell 21 and a retardation plate 24 between the liquid crystal cell 21 and the fourth polarizing plate 22. Further, a retardation plate may be provided either between the third polarizing plate 23 and the liquid crystal cell 21 or between the liquid crystal cell 21 and the fourth polarizing plate 22. By providing the retardation plate between the polarizing plate and the liquid crystal cell in this way, optical compensation of an elliptically polarized light becomes possible. This elliptically polarized light is produced by birefringence caused by the liquid crystal cell 21. As a result, light leakage can be suppressed. This can improve the viewing angle characteristic in the narrow viewing angle mode. Note that, as illustrated in FIG. 8, it is possible to provide a retardation plate 28 between the first polarizing plate 13 and the liquid crystal cell 11 and a retardation plate 27 between the liquid crystal cell 11 and the second polarizing plate 12.

Figure 11:
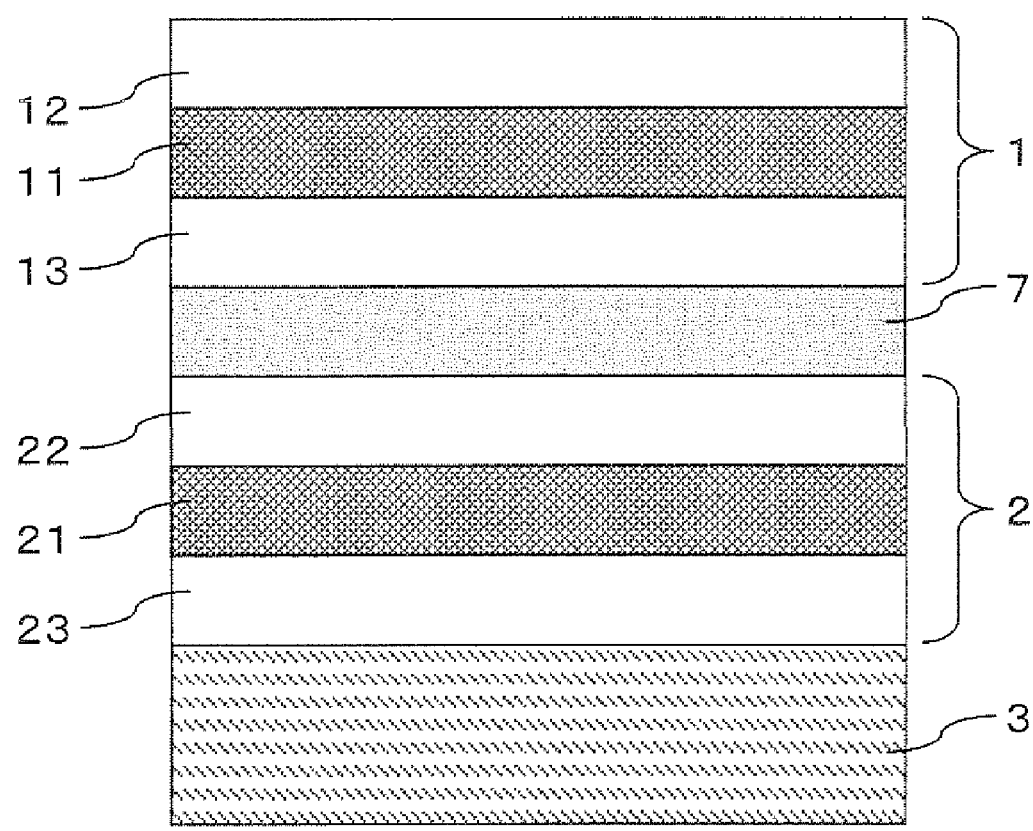
FIG. 11 is a cross sectional view illustrating an example of an arrangement of the viewing-angle-control liquid crystal panel in the liquid crystal device of the present invention.

Though the viewing-angle-control panel 2 is provided above the display liquid crystal panel 1 in the liquid crystal display device of FIG. 3, the arrangement is not limited to this. For example, the display liquid crystal panel 1 and the viewing-angle-control panel 2 may be laminated in an opposite order. That is, for example, as illustrated in FIG. 11, it is possible to arrange a liquid crystal display device, by laminating the viewing-angle-control liquid crystal panel 2 above the backlight 3 and further providing the display liquid crystal panel 1 thereon.

Though the liquid crystal cell 21 of the viewing-angle-control liquid crystal panel 2 employs a positive nematic liquid crystal in a homogenous alignment, the arrangement is not limited to this. For example, a negative nematic liquid crystal may be used for the liquid crystal cell 21. Note that, in a case where the negative nematic liquid crystal is used, behavior of the liquid crystal molecule differs from that in the case of the positive nematic liquid crystal. In the case of the negative nematic liquid crystal, the liquid crystal molecule becomes perpendicular to the substrate when no voltage is applied, and the liquid crystal molecule is tilted in a direction parallel to the substrate in accordance with the applied voltage. Therefore, a voltage should not applied to the liquid crystal cell of the viewing-angle-control panel in the case of the wide viewing angle, while a predetermined voltage should be applied to the liquid crystal cell in the case of the narrow viewing angle.

Figure 9:
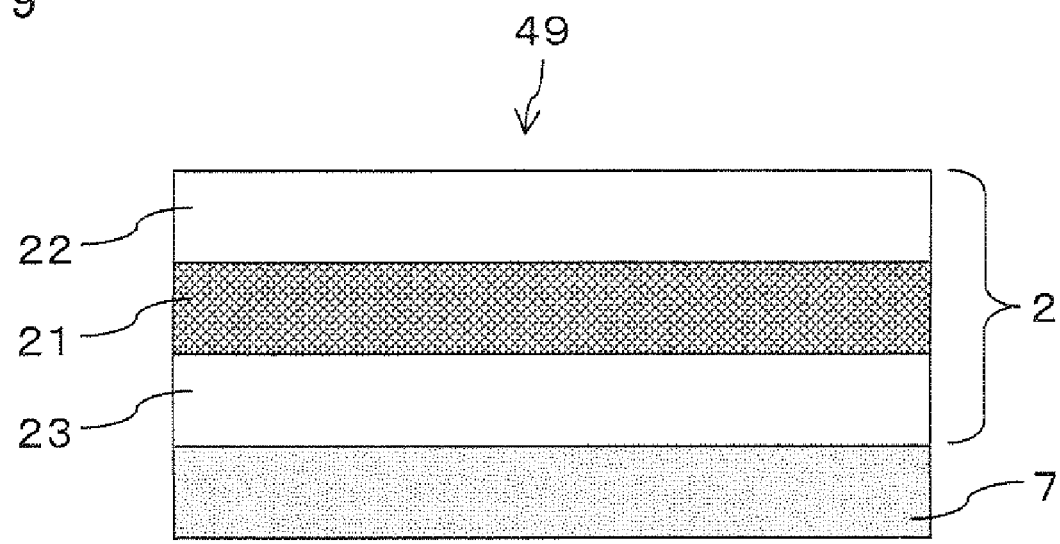
FIG. 9 is a cross sectional view illustrating an arrangement in which a display liquid crystal plate is combined with a viewing-angle-control liquid crystal panel to which a setting retardation plate has been fixed.
Figure 9:
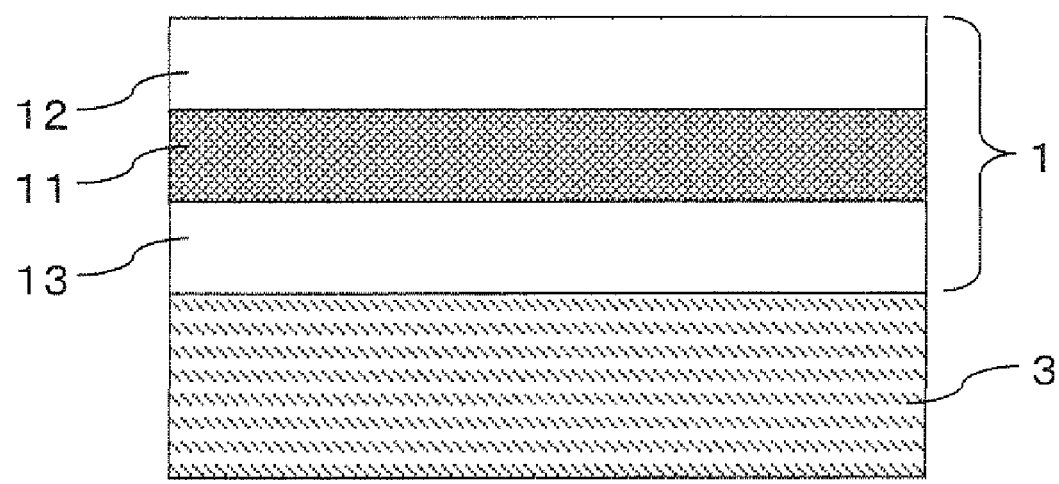

In the present embodiment, as illustrated in FIG. 9, after the setting retardation plate 7 (λ/2 plate) is fixed to a lower surface of the viewing-angle-control liquid crystal panel 2 so as to constitute a viewing angle control module 49, the liquid crystal display device may be constituted by combining this viewing angle control module 49 with an appropriate display liquid crystal panel 1.

Figure 10:
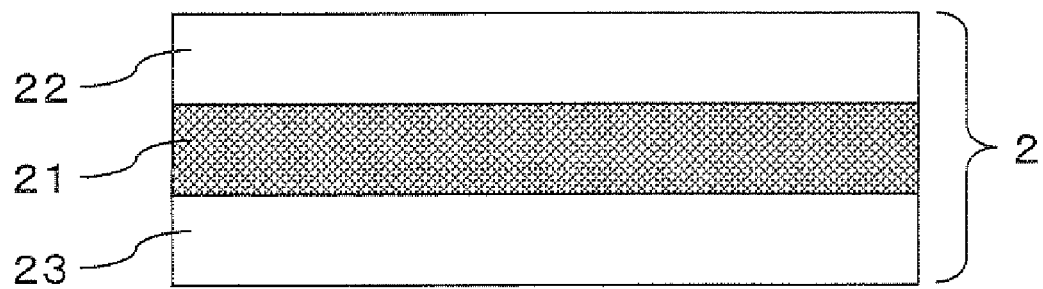
FIG. 10 is a cross sectional view illustrating an arrangement in which a viewing-angle-control liquid crystal plate is combined with a display liquid crystal panel to which a setting retardation plate has been fixed.
Figure 10:
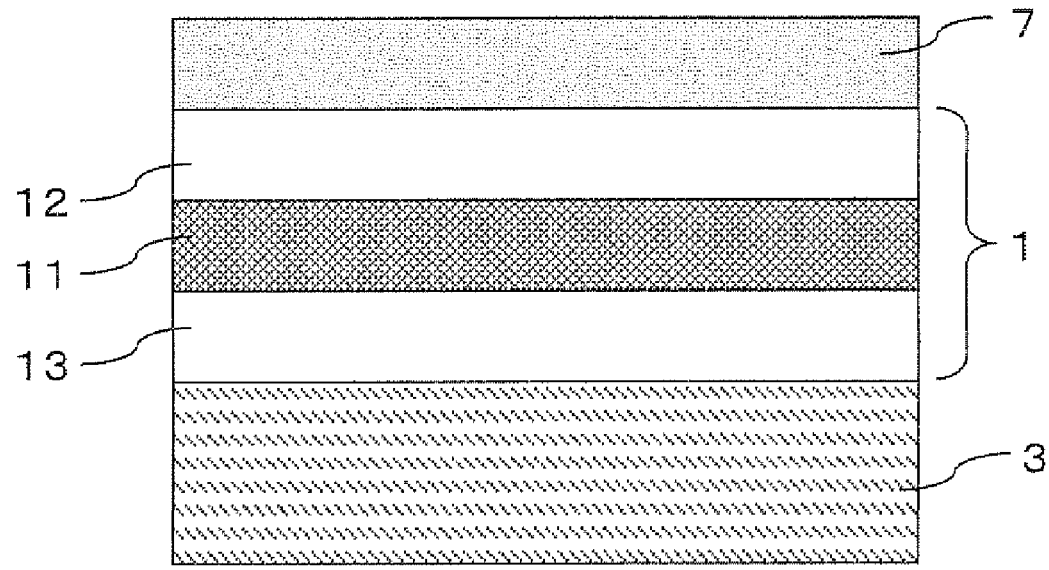

In the same manner, in the present embodiment, as illustrated in FIG. 10, the setting retardation plate 7 (λ/2 plate) may be fixed to the upper surface of the display liquid crystal panel 1 in advance. In other words, after the display liquid crystal panel 1 to which the setting retardation plate 7 (λ/2 plate) is fixed and the viewing-angle-control liquid crystal panel 2 are arranged separately, the liquid crystal display device of the present embodiment can be constituted by combining the display liquid crystal panel 1 and the viewing-angle-control liquid crystal panel 2.

Figure 17:
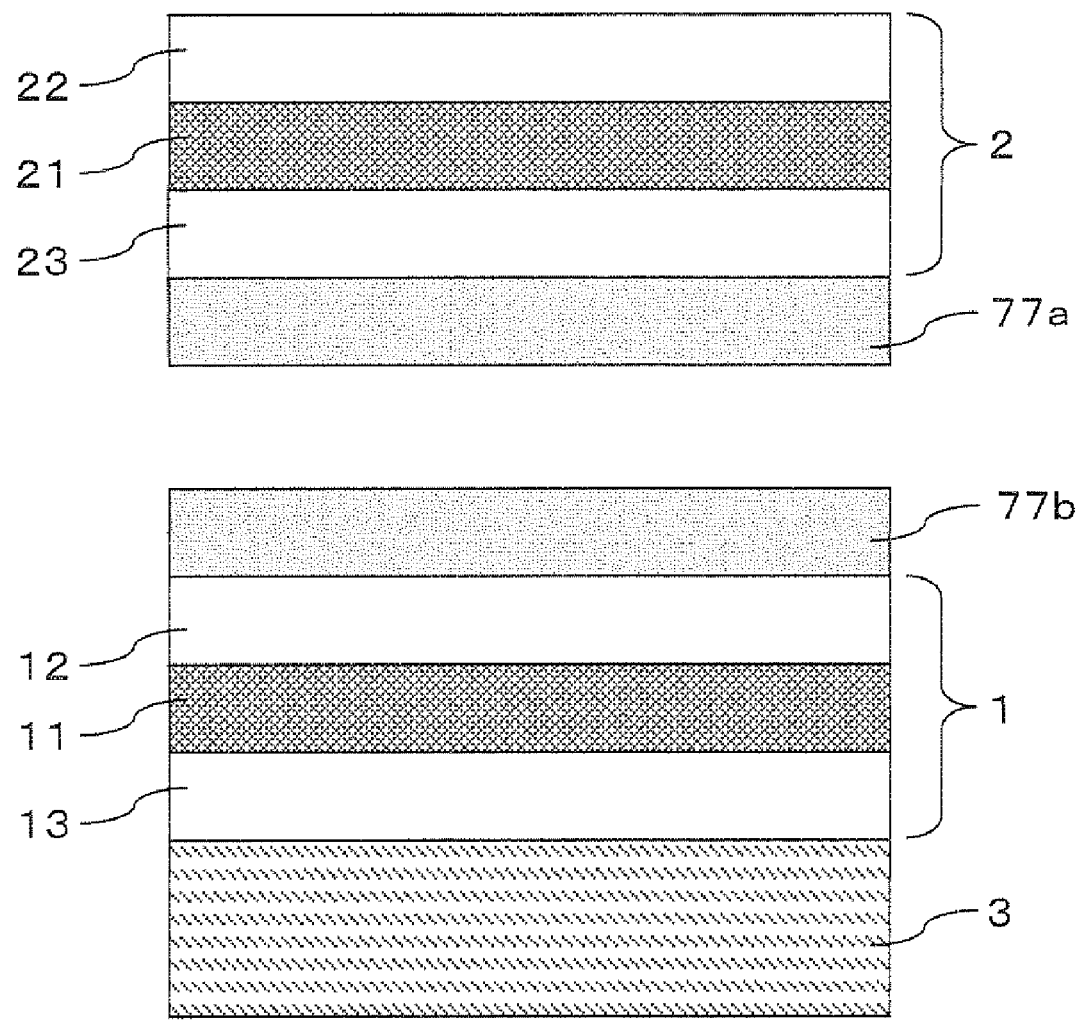
FIG. 17 is a cross sectional view illustrating an arrangement in which (i) one λ/4 plate is fixed on an upper surface of the display liquid crystal panel and another λ/4 plate is fixed on a lower surface of the viewing-angle-control liquid crystal panel and (ii) the display liquid crystal panel with the one λ/4 plate is combined with the viewing-angle-control liquid crystal panel with the another λ/4 plate.

Further, the present embodiment may have an arrangement in which, as illustrated in FIG. 17, the setting retardation plate 77a (λ/4 plate) is fixed to the upper surface of the display liquid crystal panel 1 in advance and the setting retardation plate 77b (λ/4 plate) is fixed to the lower surface of the viewing-angle-control liquid crystal panel 2 in advance. In other words, after the display liquid crystal panel 1 to which the setting retardation plate 77b (λ/4 plate) is fixed and the viewing-angle-control liquid crystal panel to which the setting retardation plate 77a (λ/4 plate) is fixed are separately arranged, the liquid crystal display device of the present embodiment may be constituted by combining the display liquid crystal panel 1 and the viewing-angle-control liquid crystal panel 2.

INDUSTRIAL APPLICABILITY

The liquid crystal device of the present invention is suitable for a liquid crystal display device in which improvement in privacy protection and security is required.

The invention claimed is:

1. A liquid crystal display device that is capable of switching viewing angle characteristics, the liquid crystal display device comprising:
a viewing-angle-control liquid crystal panel provided on a viewing surface side between a viewing surface and a backlight, the viewing-angle-control liquid crystal panel including a fourth polarizing member, a viewing-angle-control liquid crystal cell, and a third polarizing member provided in this order so as to be at least partially overlapped from the viewing surface;
a display liquid crystal panel provided on a backlight side between the viewing surface and the backlight, the display liquid crystal panel including a second polarizing member, a display liquid crystal cell, and a first polarizing member provided in this order so as to be at least partially overlapped from the viewing surface; and
a retardation member for setting a viewing restricted direction, the retardation member provided between at least the third polarizing member and the second polarizing member,
the fourth polarizing member having a transmission axis in a direction that is different from a direction of a transmission axis of the second polarizing member.

2. The liquid crystal display device as set forth in claim 1 wherein the retardation member is a half wavelength plate.

3. The liquid crystal display device as set forth in claim 1 wherein the retardation member is made of two parallel ¼ wavelength plates.

4. The liquid crystal display device as set forth in claim 2 wherein:
the second and third polarizing members are provided so that an angle between a transmission axis of the third polarizing member and an axis of the half wavelength plate becomes equal to an angle between the axis of the half wavelength plate and a transmission axis of the second polarizing member.

5. The liquid crystal display device as set forth in claim 1, further comprising:
a retardation plate at least either between the fourth polarizing member and the viewing-angle-control liquid crystal cell or between the viewing-angle-control liquid crystal cell and the third polarizing member.

6. The liquid crystal display device as set forth in claim 1, further comprising:
a retardation plate at least either between the second polarizing member and the display liquid crystal cell or between the display liquid crystal cell and the first polarizing member.

7. The liquid crystal display device as set forth in claim 1, further comprising:
a backlight emitting light that has directivity.

8. A liquid crystal display device that is capable of switching viewing angle characteristics, the liquid crystal display device comprising:
a display liquid crystal panel provided on a viewing surface side between a viewing surface and a backlight, the display liquid crystal panel including a second polarizing member, a display liquid crystal cell, and a first polarizing member provided in this order so as to be at least partially overlapped from the viewing surface;
a viewing-angle-control liquid crystal panel provided on a backlight side between the viewing surface and the backlight, the viewing-angle-control liquid crystal panel including a fourth polarizing member, a viewing-angle-control liquid crystal cell, and a third polarizing member provided in this order so as to be at least partially overlapped from the viewing surface; and
a retardation member for setting a viewing restricted direction, the retardation member provided between at least the first polarizing member and the fourth polarizing member,
the second polarizing member having a transmission axis in a direction that is different from a direction of a transmission axis of the fourth polarizing member.

* * * * *